United States Patent Office 3,511,719
Patented May 12, 1970

3,511,719
PROCESS OF MAKING TITANIUM WIRE
AND TENSION MEMBERS
Milton A. Nation, 905 Moroga Drive,
Los Angeles, Calif. 90049
No Drawing. Filed Oct. 12, 1965, Ser. No. 495,312
Int. Cl. C22f 1/18
U.S. Cl. 148—11.5                       7 Claims

ABSTRACT OF THE DISCLOSURE

A high performance tension member in the form of a monofilament predominantly containing titanium, and method of making the same, and cables in which the wires are converted from specially processed titanium rod stock into wire having no visible surface flaws, which wire is further subjected to flash pickling treatment after annealing to remove surface contamination, and wherein the cable made from such wires may be very highly prestressed and further processed prior to use in order to improve its dynamic and inertial performance.

Mechanical properties of the two alloys tested as wire, together with the wide range of process variables which are used to produce monofilament and cable, are especially suited dynamically and inertially for use in rigorous aerospace and ocean environments.

---

This invention relates generally to tension members such as wire and wire cable of titanium, and particularly relates to a process of making high-quality titanium wire and titanium tension members and to such titanium wire and cable.

For certain applications where extreme high performance is required, conventional tension members, such as wire or wire cable, have been found to fail. Such applications which require special performance are deep ocean moorings or long tethers. These might be required, for example, for sonic tow lines, high altitude tethers for balloons, kites or parafoil kites. For such high-performance applications tension members are needed, that is, monofilaments or wires as well as wire rope or cable.

For example, it will be obvious that any cable will break of its own weight when in full linear suspension as soon as its weight exceeds the breaking load of the cable. This, of course, puts a limit on both the size or diameter of the cable and its length. In order to overcome or at least reduce this problem, it has been necessary to utilize a cable of stepped sizes. Obviously, the largest diameter must be at the top of the cable from a suspension point such as a ship or a balloon. The diameter of the cable is then graduated downwardly from the suspension point whether it be a balloon in the air or a ship on the water. At each point where the cable diameter is to change, long splices have been necessary in the past, particularly because the mass involved is so large.

These splices or joints present additional problems. Thus, there will be fretting at the joints, and corrosion is normally intense if the cable is used in seawater. Furthermore, each splice has a diameter larger than that of the remainder of the cable. Hence, this diameter may be too large for the sheave or drum on which the cable is to be stored. Also the splice stiffens the cable which makes it harder to handle. Unless the splices are extremely well made they present points of reduced strength. Similar objections may be made to a joint used for connecting two separate monofilaments or wires of different diameters.

It is accordingly an object of the present invention to provide both monofilaments and wire cables of titanium or titanium alloys having stepped diameter and which do not require splices or joints.

Another object of the present invention is to provide a single titanium alloy monofilament with graduated, stepped diameters along its length which has high mechanical performance and may be woven into a stepped diameter cable as well as to a process of making such monofilaments and wire cables.

The present invention also relates to wires having unusually uniform and predictable mechanical properties with a resulting large increase in reliability of the wire or cable made from such wires. Thus, in accordance with the present invention it is feasible to fabricate wire of titanium or titanium alloy which have unusual mechanical properties. Since the modulus of elasticity of titanium is much lower than that of conventional ferrous alloys, the resulting wire or cable can be made more stable. Further, titanium has high corrosion resistance and is particularly suitable for use in seawater. The fatigue life of titanium wire or cable is much superior to that of wire of ferrous alloys. Finally, the mechanical strength is normally higher and the strength-to-weight ratio is more favorable than that of conventional ferrous alloys. It may also be noted that there is a very narrow gap between the ultimate strength and the yield strength as compared to that of steel and ferrous alloys. Thus, from titanium alloys it is possible to obtain stable, homogeneous microstructures. Since the microstructure is so stable it causes substantially no change in mechanical properties.

It is accordingly a further object of the present invention to provide wire of titanium or titanium alloy with extremely uniform and predictable mechanical properties and a process of making such wires.

It may also be noted that wire of titanium alloy in accordance with the present invention may be straightened and proof-tested to improve its mechanical properties and to facilitate its manufacture into cables.

In accordance with the present invention a titanium alloy billet is normally processed into coiled rod stock which is substantially without surface flaws and which has no scale and, hence, is a superior base material.

It is accordingly another object of the present invention to provide a process of making titanium wire from a titanium billet without necessarily drawing down the wire in steps in such a manner that the resulting titanium structural wire has superior mechanical properties necessary for high-performance systems and which is capable of withstanding severe environments such as seawater.

In accordance with the present invention there is provided a monofilament consisting primarily of titanium, that is, of titanium or titanium alloys and which is suitable for high-performance purposes such as deep moorings or long tethers. This filament is continuous and preferably has a plurality of diameters graduated from one end to the other with relatively abrupt steps between different diameters. In addition, the monofilament is substantially without surface flaws which might reduce or affect its mechanical properties. It is also contemplated that a stepped diameter cable be made of a plurality of monofilaments having equal, graduated steps.

In addition, there is provided a process for making titanium monofilaments or cables which may have such stepped diameters. This process will also provide wire of superior properties. However, such wire need not necessarily be drawn to have stepped diameters. Preferably, however, the wire is straightened and proof-tested above 75% of its breaking strength. This has been disclosed and claimed in the applicant's co-pending application entitled "Titanium Wire and Wire Rope and Process of Making Same" and filed concurrently herewith.

The novel features that are considered characteristic of this invention are set forth with particularity in the appended claims. The invention itself, however, both as to its organization and method of operation, as well as additional objects and advantages thereof, will best be understood from the following description.

In accordance with the present invention a titanium structural wire with stepped diameters may be prepared in the following manner. In order to make a stepped diameter titanium wire, it is first necessary to have available a long piece of substantially flawless wire or thin rod stock. In particular, the surface of the wire should be substantially free of any flaws which would reduce or adversely affect its mechanical properties. It might also be noted that such a wire is preferably made from alpha-beta and all-beta alloys of titanium. An example of an all-beta alloy is one containing 13% vanadium, 11% chromium, 3% aluminum, the remainder being titanium. An example of an alpha-beta alloy is one which contains 6% aluminum, 4% vanadium, the remainder being titanium.

In order to obtain such long flawless wires adapted to be drawn so that they have stepped diameters, it is best to start with a high-quality billet which is, subsequently, converted into a rod. The billet, of course, should have sufficient weight to obtain the desired length of continuous monofilament or wire of titanium or titanium alloy. The billet may have to be conditioned by grinding or turning if it has any visible flaws. It will be understood that such surface flaws can normally not entirely be eliminated but they can be much reduced as they develop. The billet is then drawn into a coiled rod, for example, by a blooming mill, a continuous hot mill, warm extrusion, hot swaging or in any other conventional manner. Since the resulting rod should be a single contiuous piece, it must, of course, be preformed for coiling because otherwise it could not be stored.

Further processing of the coiled rod into structural wire requires that the rod stock be of high quality. This means that the rod should have a smooth surface without lines, fins, cracks or other visible outer imperfections. If the rod does not have such a smooth surface it may be necessary to grind the coiled stock to obtain such a smooth surface.

Such a coiled rod is then converted into wire, for example, by drawing or rolling. During the processing of the coiled rod into wire it is important to maintain a relatively uncontaminated surface. Such contaminations may develop from two causes. Thus, a surface may be enriched by contaminants such as oxygen from the air. On the other hand, lubricants may be mixed or diffused into the oxide film which forms on the surface of the wire. Eventually, this oxide may diffuse into the interior to adversely affect the metal microstructure. Such contamination causes embrittlement of the resulting wire and, of course, a loss of quality and mechanical properties. To this end the rod or wire may be treated by flash pickling. This may best be done during intermediate annealing steps. However, it will be understood that the pickling must be strictly controlled so that only a very thin surface layer is removed. The flash pickling is preferably done by micrometer control so that no more than approximately 0.0002" of surface is removed. This will avoid excessive loss of mechanical properties and of material. In addition, it will be understood that the flash pickling removes minor flaws which generally develop when the rod is converted into wire form.

The wire is drawn down by a series of dies or else by conventional horizontal and vertical rollers in a mill. It is quite important that the dies or rollers used to draw down the wire are substantially perfect so that further flaws and stress raisers are not developed on the surface. Obviously, any imperfection of the die will cause an irregularity of the surface. The same, of course, applies to the rollers, if they are used.

The two principal strengthening mechanisms, namely, work hardening and heat treating hould be correlated during the processing of the rod into wire. All titanium alloys workharden very well under wire drawing. However, there is a distinct difference between various alloys and their response to heat treatment. Some alloys do not respond but others are very responsive. However, the greatest response is obtained from aging treatment. Multiple treatment is sometimes required. For example, the all-beta alloy consisting of 13% vanadium, 11% chromium, 3% aluminum, the remainder being titanium requires straightforward use of intermediate anneals followed by aging. The latter takes place at the final cross-sectional diameter of the wire. The processing results in a wire having a tensile strength of about 300,000 p.s.i. (pounds per square inch).

During the drawing of the rod into a wire it is important to use a suitable lubricant for titanium with a suitable wetting technique to avoid breaking of the wire. However, only such lubricants should be used which become a host to the titanium oxide film which forms at the surface of the titanium or titanium alloy. Among these lubricants are included fluorides and monodisulphide.

As a result of this treatment wires are obtained of titanium or titanium alloy having a superior surface smoothness. The resulting wire has a high gloss. Flaws cannot be detected by the naked eye except with a magnification of 50 to 70 power. With such magnification it is found that the irregularities or treebarks are equivalent to those of fine drawn stainless steel.

Further, wire is obtained having homogeneous mechanical properties with good bendability and smooth uniform microstructure. In addition, a strong uniform oxide film is obtained on the surface which inhibits crevice and stress corrosion. These types of corrosion are serious in structural metals. However, it has been found that they do not occur in the presence of only minor flaws but do occur when cracks are present. The high gloss of the surface is an excellent indicator that there are no serious internal flaws. Apparently, such internal flaws reflect at the surface because the cross-section of the wire is relatively small.

Where it is desired to obtain a wire with stepped diameter the wire should be drawn in such a manner that the appropriate lengths have the desired diameter. The diameters are, of course, graduated from one end to the other. In use the portion of the wire with the largest diameter is suspended downwardly so that the lowest end has the smallest diameter.

During the drawing of the wire an optimum balance must be obtained between strength and elongation for each particular alloy. After the last intermediate annealing step of the wire, the maximum number of passes should be used to retain adequate elongation with good ductility. This procedure will somewhat vary with the different alloys.

The heat treatment response should also be correlated with the work-hardening response. Hence, as outlined before, after the last set of drawing passes the wire should be aged followed by a flash pickling to remove the minimum amount of surface. Before the final aging any lubricants are preferably removed so that they will not diffuse into the wire and might possibly cause loss of mechanical properties.

For many applications of structural wires it may be desirable to straighten the wire before use. This prestretching which causes straightening has been disclosed and claimed in applicant's co-pending application referred to hereinabove. However, in any case, the structural wire may be straightened and prooftested above 75% of the breaking load. Such processing will, of course, remove the inherent coil which was imparted to the rod. Hence, the resulting wire will be substantially straight and has little or no tendency to coil or kink.

However, it should be noted that the prestretching is not necessary for certain applications of the wires. Preferably, however, this processing is done while the wire is being drawn under proper control.

It should be noted that the drawing of the wire as described herein, that is, under high tension, and with continuous surface examination practically eliminates not only external but internal flaws as well. If the starting material is a coil stock such as a coiled rod having a smooth surface, a smooth surface finish of the final wire with minimum stress raisers is practically guaranteed provided the wire is inspected on a continuous basis. It will be almost obvious that the absence of surface contamination provides for maximum strength and gives good bendability and ductility. Hence, as a result, the wire obtained in accordance with the present invention has very uniform properties. These properties should be essentially identical in long production length from large billets. Thus, the length of the wire may be made as long as the mass of the billet will allow. Of course, there may be a very small amount of loss. The resulting wires may be reeled onto large drums and reels, or loosely coiled.

The straightening and prestretching of the titanium structural wire also serves the purpose to prooftest the wire. In other words, if the wire will withstand stretching within the range of say 80% to 95% of its tensile strength, this indicates the absence of flaws which would prevent employment of the wire in high-performance systems.

It may now be convenient to give an example of a design for a high altitude balloon tether followed by an example of a long cable suitable for oceanographic applications.

It may be noted that the principal design objectives of a stepped cable are reduced weight and minimum diameter of the cable which reduces aerodynamic or hydrodynamic drag when the cable is moved. This, in turn, reduces inertial forces existing on and in the cable and reduces the handling problems because of the smaller weight of cable.

Assuming, for example, that it is necessary to design a high-altitude balloon tether 120,000' in length. Assuming further that it is necessary that the balloon should fly at the highest altitude feasible with a minimum inertial load and the minimum catenary. It might be noted, in general, that if the cable is to be used in air the aerodynamic drag is smaller than the hydrodynamic drag for a corresponding ocean cable. On the other hand, since water is denser than air, it provides more buoyancy.

For this balloon tether it is assumed that the tether consists of a monofilament or single, continuous wire having four steps or diameters. To this end it is assumed that a sufficiently large billet is available. Obviously, the largest diameter must be at the top. The design must provide for the inertial load of the balloon and an addition for tension peaks or impact loads as well as the weight of the cable. It may be assumed that the maximum tension peak and wire weight is 750 lbs. minimum breaking load. This requires a cross-sectional diameter of 0.0625". The monofilament may consist of an all-beta alloy, that is, 13% vanadium, 11% chromium, 3% aluminum, the remainder being titanium with a density of 0.173 per cubic inch. Assuming that the first step has a length of 30,000', it weighs 185 lbs. The second portion of the cable has the same length of 30,000' and a diameter of 0.054" and weighs 145 lbs. The third 30,000' length has a diameter of 0.047" and weighs 115 lbs., and the last portion of 30,000' length has a wire diameter of 0.040" and weighs 80 lbs. Thus, the total weight of the monofilament is 525 lbs. as compared to the 750 lbs. minimum breaking load at the top of the tether. This represents a weight saving of 225 lbs. In addition, there is a considerable reduction in aerodynamic drag and in the forces of inertia.

It will be noted that the titanium monofilament which just has been described will simplify the handling problems, and that, of course, joints have been eliminated which would be required in a steel piano wire tether if there were not a single, continuous monofilament of stepped diameter. It may also be noted that short monofilaments having four distinct steps of titanium alloy wire have been successfully fabricated and it was found that these monofilaments have mechanical properties such as a tensile strength greater than 300,000 p.s.i. (pounds per square inch).

Further, by way of example, a stepped cable may also be made from a plurality of stepped wires. Such stepped cables may, for example, be utilized for deep-ocean moorings. A stepped cable may be manufactured in a conventional manner from a plurality of equal, stepped wires. As pointed out before, when a cable is used in water there is more buoyancy than in air, but on the other hand, the hydrodynamic drag is greater than the aerodynamic drag. The stepped wires or cables of the invention may also be used for aerial tow lines for sonic tow speeds. In that case, inertial forces may become very great. Here the catenary may become pretty taut but there is still enough of a curve in the cable to provide elastic absorption of tension peaks or impact loads.

As pointed out before, stepped cables can be made without splicing by utilizing a plurality of equal, stepped, structural wires. In the stranding and final assembly operation for closing the cable the stepped diameters of the cable automatically result because the structural wires of which the cable consists have been stepped as pointed out hereinbefore.

Let it be assumed that it is necessary to fabricate a 3/4" 6 x 19 cable, 40,000' in length. It should be noted that the 6 x 19 cable indicates that the cable has 6 strands, each strand consisting of 19 individual wires. This cable may, for example, be made from an all-beta titanium structural wire. If the cable were made of steel it would weigh 41,600 lbs., namely, 40,000' × 1.04 lbs. per foot. On the other hand, a cable made of all-beta titanium alloy weighs 25,040 lbs. because the density ratio between titanium and steel is 0.17 to 0.283. A steel cable would fracture from its own weight if its diameter were reduced to about 7/16 of an inch. However, the titanium cable can carry over 16,500 lbs. or 8¼ tons more than a steel cable, assuming, of course, that each cable has the same breaking strength.

Let it be assumed that the 3/4" 6 x 19 cable requires three wire sizes, namely, 0.041", 0.053" and 0.057". On the other hand, it is feasible to select four different diameters, which change at each 10,000' point. It may also be desired to scale the steps at conventional cable sizes such as 3/4", 5/8", 9/16" and 1/2". By stepping the cable in this manner without a great effort at optimizing, the cable weight is reduced from 25,040 lbs. to 17,520 lbs. or a decrease of 7,520 lbs. By thus reducing the weight of the cable its capacity is increased while the inertial forces are decreased and the handling problem is facilitated.

The above example for both a single wire and a wire cable show the weight savings and advantages to be obtained from stepping the wire or the cable.

It was previously mentioned that it is possible to prooftest strutural titanium wire in accordance with the present invention. The processing of such wire can be effected automatically, provided a sufficiently large rod is used to start the drawing operation. However, the tension used in drawing the wire should become a matter of record. Thus, the tension required to draw the initial size of coiled rod stock should be greater than the designed breaking load of the finished structural wire. As a result, the structural wire is prooftested to a greater strength than the breaking load. Furthermore, the reduction in area effected by the drawing operation is sufficiently large to uncover serious flaws. Those imperfections which may still exist in the surface and microstructure of the final wire product do not materially affect or reduce mechanical properties such as tensile strength or breaking load.

It will now be evident that a stepped monofilament tension member of titanium or titanium alloy may be made during the wire drawing process without requiring welds or joints. Such tension members have substantial performance gains particularly in dynamic tension systems. They have reduced aerodynamic and hydrodynamic drag because the diameters are generally smaller.

Similarly, wire cables may be stepped in diameter without the necessity of using splices. This is made possible by utilizing the appropriate number of equal, stepped structural wires for the cable assembly. Again, there is a substantial performance gain. The carrying capacity of the cable is increased while again the hydrodynamic and aerodynamic drag is reduced. The splicing of cables, which was required for conventional stepped cables, causes non-uniformities in the properties of the cable as well as fretting and corrosion at the splices of the cable.

In addition, as pointed out above, the monofilaments may be straightened and prooftested when the wire is drawn to between approximately 80% and approximately 95% or higher of the breaking load. This treatment removes the inherent coiling tendency of the filament but does not materially reduce the tensile strength. At the same time, it serves the purpose to test long lengths of structural wire for flaws which they might contain.

Surface contamination may be uniformly removed by flash pickling. For example, approximately 0.0002" of wall thickness may be removed in each flash pickling operation. This prevents diffusion of the contaminations into the interior of the metal wire and also serves the purpose to remove minor surface flaws.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example and we do not wish to be restricted to the specific form described or uses mentioned except as defined in the accompanying claims, wherein various portions have been separated for clarity of reading and not for emphasis.

I claim:

1. A process of preparing a monofilament consisting predominantly of titanium comprising the steps of:
    (a) directly converting a rod consisting predominantly of titanium into wire;
    (b) prestretching the wire while drawing to between approximately 80% and approximately 95% of the breaking load; and
    (c) aging the wire.

2. A process of preparing a monofilament consisting predominantly of titanium comprising the steps of:
    (a) grinding the surface of a rod consisting predominantly of titanium until there are no visible surface flaws;
    (b) directly converting the rod into wire;
    (c) flash pickling the wire before annealing to remove surface contaminations;
    (d) prestretching the wire while drawing to between approximately 80% and approximately 95% of the breaking load; and
    (e) coiling the wire.

3. A process of preparing a monofilament consisting predominantly of titanium comprising the steps of:
    (a) grinding the surface of a billet consisting predominantly of titanium until there are no visible flaws;
    (b) directly converting the billet into a rod;
    (c) flash pickling the rod before annealing to remove surface contaminations;
    (d) coiling the rod for storage;
    (e) directly converting the rod into wire;
    (f) prestretching the wire while drawing to between approximately 80% and approximately 95% of the breaking load; and
    (g) coiling the wire.

4. A process of preparing a monofilament consisting predominantly of titanium for high performance systems comprising the steps of:
    (a) grinding the surface of a rod consisting predominantly of titanium until there are no visible flaws;
    (b) drawing the rod into wire;
    (c) flash pickling the wire to remove surface contaminations;
    (d) drawing the wire so that consecutive, predetermined lengths have different diameters; and
    (e) coiling the stepped wire.

5. A process of preparing a monofilament consisting predominantly of titanium for high-performance systems comprising the steps of:
    (a) grinding the surface of a rod consisting predominantly of titanium until there are no visible flaws;
    (b) directly converting the rod into wire;
    (c) flash pickling periodically the wire to remove surface contaminations;
    (d) prestretching the wire while directly converting it to between approximately 80% and approximately 95% of the breaking load; and
    (e) forming the wire so that consecutive, predetermined lengths have different, graduated diameters.

6. A process of preparing a monofilament consisting predominantly of titanium comprising the steps of:
    (a) grinding the surface of a rod consisting predominantly of titanium until there are no visible surface flaws;
    (b) drawing the rod into wire while maintaining the surface of the wire substantially uncontaminated;
    (c) flash pickling the wire periodically to remove surface contamination; and
    (d) coiling the wire.

7. A process of preparing a monofilament consisting predominantly of titanium comprising the steps of:
    (a) grinding the surface of a billet consisting predominantly of titanium until there are no visible surface flaws;
    (b) directly converting the billet into a rod;
    (c) flash pickling the rod periodically to remove surface contamination;
    (d) coiling the rod for storage;
    (e) directly converting the rod into wire while substantially preventing surface contaminations of the wire; and
    (f) coiling the wire.

References Cited

UNITED STATES PATENTS 2,974,076  3/1961  Vordahl _____ 148—12.7
2,214,709  9/1940  Peskin _____ 57—166

L. DEWAYNE RUTLEDGE, Primary Examiner
W. W. STALLARD, Assistant Examiner

U.S. Cl. X.R.
29—193; 148—31